United States Patent [19]
Brindoepke et al.

[11] Patent Number: 5,215,828
[45] Date of Patent: Jun. 1, 1993

[54] CURABLE BINDERS

[75] Inventors: Gerhard Brindoepke, Sulzbach; Inge Kurth, Wiesbaden; Michael Schwab, Niedernhausen-Oberjosbach; Gerd Walz, Wiesbaden, all of Fed. Rep. of Germany

[73] Assignee: Hoechst AG, Fed. Rep. of Germany

[21] Appl. No.: 932,308

[22] Filed: Aug. 19, 1992

[30] Foreign Application Priority Data

Aug. 21, 1991 [DE] Fed. Rep. of Germany ....... 4127605

[51] Int. Cl.$^5$ .................. B32B 23/08; B32B 27/10
[52] U.S. Cl. .................. 428/526; 528/230; 528/233; 528/246; 528/254; 528/256; 528/258; 528/266; 528/368; 528/369; 525/439; 525/440; 525/441; 525/445; 525/539; 525/540; 524/220; 524/367; 428/502
[58] Field of Search ............ 528/230, 233, 246, 254, 528/256, 258, 266, 368, 369; 525/439, 440, 441, 445, 539, 540; 524/220, 367; 428/502, 526

[56] References Cited

U.S. PATENT DOCUMENTS

| | | | |
|---|---|---|---|
| 3,928,273 | 12/1975 | Chang et al. | 524/512 |
| 3,992,338 | 11/1976 | Noyes | 525/7.3 |
| 4,034,017 | 7/1977 | Chang et al. | 525/440 |
| 4,107,229 | 8/1978 | Tideswell et al. | 525/502 |
| 4,143,091 | 3/1979 | Chang et al. | 525/125 |
| 4,338,379 | 7/1982 | Strolle et al. | 428/520 |
| 4,360,641 | 11/1982 | Tobias | 525/301 |
| 4,413,037 | 11/1983 | Tobias | 428/461 |
| 4,490,417 | 12/1984 | Shindow et al. | 427/388.3 |
| 4,865,705 | 9/1989 | Hendrikx et al. | 204/181.7 |
| 4,892,906 | 1/1990 | Pham et al. | 524/730 |

Primary Examiner—Maurice J. Welsh
Assistant Examiner—S. A. Acquah
Attorney, Agent, or Firm—Bierman and Muserlian

[57] ABSTRACT

Curable binders obtained by simultaneous reaction of
A) urethanes or ureas,
B) acrylic or methacrylic compounds containing hydroxyl groups,
C) paraformaldehyde and
D) if appropriate, polyols, wherein, in the case where no polyol D) is also reacted, the reaction is carried out in the presence of an acid ion exchanger, and in the case where a polyol D) is also reacted, the reaction is carried out in the presence of an acid ion exchanger or a strong acid.

These binders are suitable as coating compositions which can be cured by electron beams or by UV light.

8 Claims, No Drawings

CURABLE BINDERS

The invention relates to binders which can be cured by high-energy radiation or free radicals and are in the form of a polymerizable unsaturated resin with (meth)acrylic groups which is based on urethanes or ureas.

It is known that coating compositions which contain, as binders, prepolymers carrying acrylate groups can be cured by high-energy radiation to give coatings having a good adhesion, smooth surface and good abrasion resistance and impact strength.

According to DT-AS 1,745,540, such resins are prepared by reaction of melamine/formaldehyde condensates with hydroxyacrylates. Cation exchange resins or silicates are employed as catalysts in this reaction. DT-AS 2,132,318 describes acrylate-based paints and coating compositions which are built up in a quite complicated manner, can be cured by electron beams and comprise, inter alia, a reaction product of an amine/formaldehyde condensate with a hydroxyacrylate. The reaction is carried out in a weakly alkaline or weakly acid medium, for example in the presence of acrylic acid. The acrylate-modified melamine/formaldehyde condensates according to SZ-PS 560,729 which can be cured by electron beams are also prepared by reaction in the weakly acid range, for example in the presence of formic acid.

Resins of this type are also known from DE-OS 2,550,740 In contrast, the resins described therein are prepared in the presence of strong acids.

The prior art mentioned has the common feature that the aminoplast-forming agents are first methylolated with formaldehyde and then etherified with an alcohol. It has now been found that such resins can be prepared by reacting the urethanes or ureas simultaneously with formaldehyde and the hydroxyalkyl (meth)acrylate in the presence of an acid ion exchanger.

The invention thus relates to curable binders which are obtained by simultaneous reaction of A) urethanes or ureas,
B) acrylic or methacrylic compounds containing hydroxyl groups,
C) paraformaldehyde and
D) if appropriate, polyols, wherein, in the case where no polyol D) is also reacted, the reaction is carried out in the presence of an acid ion exchanger, and in the case where a polyol D) is also reacted, the reaction is carried out in the presence of an acid ion exchanger or a strong acid.

The urethanes and ureas which are suitable for the present invention are preferably compounds of the formula

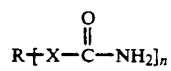

in which

X is an oxygen atom or a group of the formula —NH— and n is a number from 1 to 5, and, in the case where n is 1, R is $C_1$-$C_{10}$-alkyl, benzyl, phenyl or a group of the formula $R^1$-$OCH_2CH_2$— or $R^1$—O—$CH(CH)_3$—$CH_2$— and in the case where n is a number from 2 to 5, R is $C_4$-$C_{15}$-alkylene, phenylene or a group of the formula —$(OCH_2CH_2)_xO$— or —$(OCH(CH_3)CH_2)_xO$—, in which the value for the index x is chosen such that the polyoxyalkylene groups have molecular weights of 100 to 15000, and $R^1$ is hydrogen, $C_1$-$C_4$-alkyl or phenyl. Examples of such compounds are methyl-, ethyl-, butyl-, cyclohexyl- and phenylurethane and the corresponding urea compounds, and the reaction products of ammonia or amino alcohols, such as, for example, ethanolamine or propanolamine, with ethylene carbonate or propylene carbonate, and the reaction products of di- or triols, such as, for example, hexanediol, trimethylolpropane, polyethylene glycol, or polypropylene glycol, with urea, ammonia being split off and a di- or polyurethane being formed. Ethyl- and butylurethane are particularly preferred.

Acrylic or methacrylic compounds containing hydroxyl groups are used as component B. Monoesters of (meth)acrylic acid with $C_2$-$C_4$-alkanediols, such as hydroxyethyl(meth)acrylate, hydroxypropyl(meth)acrylate and butanediol monoacrylate, are preferred.

Suitable polyols as component D) are $C_2$-$C_{15}$- - di-, tri- or tetraols, such as, for example, trimethylolpropane, ethylene glycol, butylene glycol, pentaerythritol or pentanediol; and polyester-polyols, polyetherpolyols and polycarbonate-diols or -triols.

Such polyesters containing hydroxyl groups can be prepared by esterification of dicarboxylic acids with diols and triols by well-known methods (cf., for example, P. J. Flory, J. Am. Chem. Soc. 58, 1877 (1936) and J. Am. Chem. Soc. 63, 3083 (1953)). The reaction here can be carried out in bulk or in the presence of an entraining agent.

The starting substances for such polyesters containing hydroxyl groups (=polyester-polyols) are well-known to the expert. Substances which are suitable for this reaction are thus dicarboxylic acids, for example phthalic acid, isophthalic acid, terephthalic acid, hexahydrophthalic acid, succinic acid, glutaric acid, adipic acid, pimelic acid, seberic acid, azelaic acid and sebacic acid, isomers thereof and esterifiable derivatives thereof, such as, for example, the anhydrides or dialkylesters of the acids mentioned. Examples of suitable diols which may be mentioned are alkylene glycols, such as, for example, ethylene glycol, propylene 1,2- and 1,3-glycol, butane-1,4-diol, pentane-1,2-diol, neopentyl glycol, hexane-1,6-diol, 2-methylpentane-1,5-diol, 2-ethylenebutane-1,4-diol and dimethylolcyclohexane. Suitable triols are, for example, glycerol, trimethylolethane, trimethylolpropane and trimethylolbutane. Suitable polyols of higher functionality are, for example, pentaerythritol, di-(trimethylolpropane), di-(pentaerythritol) and sorbitol. Other di- or polyols which are suitable for the preparation of the polyesters are the alkoxylated derivatives obtainable by reaction of the abovementioned alcohols with ethylene oxide or propylene oxide.

Suitable polyols D) are moreover also polylactonediols and -triols. These products are obtained, for example, by reaction of ε-caprolactone with a diol. Such products are described in US-PS 3,169,945.

The polylactone-polyols which are obtained by this reaction are distinguished by the presence of a terminal hydroxyl group and by recurring polyester portions, which are derived from the lactone. These recurring molecular portions can correspond to the formula

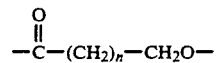

in which n is preferably 2 to 10.

The lactone used as a starting material can be any desired lactone or any desired combination of lactones, where this lactone should contain at least 4 carbon atoms in the ring. The lactone used as the starting material can be represented by the following general formula

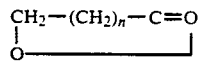

in which n has the meaning already given above. The lactone preferred in the invention for the preparation of the polylactone-diols is ε-caprolactone, in which n has the value 4. Various other lactones furthermore can be used, individually or in combination.

Examples of aliphatic diols which are suitable for the reaction with the lactone are the diols already mentioned above for the reaction with the carboxylic acids.

The polyethers which contain hydroxyl groups (=polyether-polyols) and can be employed in the process according to the invention can be obtained by reaction of di- and/or polyhydric alcohols with various amounts of ethylene oxide and/or propylene oxide by well-known methods (cf., for example, Houben-Weyl, Volume XIV, 2, Makromolekulare Stoffe [Macromolecular Substances] II, (1963)).

The polymerization products of tetrahydrofuran can also be employed. The number-average molecular weight of the polyether-polyols is between 400 and 4000, preferably between 450 and 2000.

Suitable polycarbonate-diols and -triols are polyesters, which contain hydroxyl groups, of carbonic acid with di- or triols, in particular esters based on ethylene glycol, butanediol, hexanediol or neopentyl glycol. These polycarbonate-polyols have a molecular weight ($M_n$) of 200 to 4000.

Polyesters or polyethers which have an OH functionality of between 2 and 3.5 are preferably employed.

The urethanes or ureas, (meth)acrylic compounds and, if appropriate, polyols described above are reacted with one another, together with paraformaldehyde, in the presence of an acid ion exchanger in a single reaction step. The amount of paraformaldehyde depends on the nature of the first starting component. If urethanes are used, the molar ratio of urethane to paraformaldehyde, calculated as HCHO, is 1:4 to 1:0.5. If ureas are chosen as the first starting component, the molar ratio of urea to paraformaldehyde (HCHO) is 1:5 to 1:0.5. The content of polyols can be varied according to the desired use technology properties. The molar ratio of the (meth)acrylate compound containing hydroxyl groups to the OH equivalent in the polyol is in general 1:0.05 to 0.1:0.9. If polyols are employed as component D), the ratio of urethanes to polyols is in general chosen such that the ratio of NH equivalents to OH equivalents is 1:1 to 1:3, preferably 1:1 to 1:2. If ureas are used, the ratio of NH equivalents to OH equivalents is 1:0.5 to 1:1.5, preferably 1:0.5 to 1:1.

The reaction is catalysed by cation exchangers in the acid form. All the customary and known synthetic exchangers are possible here, as are also, however, naturally occurring exchangers in the form of silicates, such as, for example, montmorillonite. The amount of ion exchanger here is 0.05 to 2% by weight for synthetic exchangers and 1 to 10% by weight for naturally occurring exchangers.

If polyols D) are also used, the reaction can also be catalysed by addition of strong acids, such as, for example, sulfuric acid, p-toluenesulfonic acid, methanesulfonic acid, phosphoric acid or perchloric acid.

The reaction is preferably carried out in the presence of 0.01 to 0.5% by weight, based on the first two components mentioned, of inhibitors, for the purpose of preventing polymerization of the acrylic compounds. Suitable inhibitors are, for example, hydroquinone, hydroquinone monoalkylethers, phenothiazine or salts of N-nitrosocyclohexylamine.

Particularly suitable polymerization inhibitors are:

alpha-substituted phenolic compounds, compounds of comparatively low volatility, in particular those based on appropriately substituted mono- or polyhydric phenols, being particularly suitable, unsubstituted phenol compounds, in particular hydroquinone, although the addition of active charcoal already to the reactant mixture to establish light color values in the reaction product is advisable here, and as polymerization inhibitors which are of particular physiological interest, representatives from the class of tocopherols, and in particular at least a proportion of alpha-tocopherol (vitamin E).

Specifically, the following applies: Particularly suitable representatives of the first class mentioned of alpha-substituted phenol compounds are disubstituted hydroquinone derivatives, 2,5-di-tertbutylhydroquinone being of particular importance. Other examples are p-methoxyphenol, 2,5-di-tert-butyl-p-cresol, methylhydroquinone and/or tert-butyl-pyrocatechol. In particular, however, using the 2,5-di-tert-butylhydroquinone already mentioned, it is possible to prepare polyfunctional (meth)acrylic acid esters which can be cured by radiation, have a high purity and in particular have a low intrinsic color, even under comparatively severe process conditions. The reaction products obtained furthermore are distinguished by a high storage stability.

If phenol compounds which are unsubstituted in the alphaposition are employed as inhibitors—as already mentioned, hydroquinone is a particularly important representative here—the simultaneous use of active charcoal already in the condensation reaction leads to effective prevention of undesirably deeply discolored reaction products. The amount of active charcoal chosen can vary here within wide limits. It should preferably amount to several times the amount of phenol compound employed as the inhibitor. Although satisfactory brightenings in color can already be established in the reaction product with 1 to 10 times the amount, the active charcoal is nevertheless in general employed in larger amounts, for example in the range from 10 to 100 times, and advantageously in the range from about 20 to 60 times the amount of hydroquinone.

If tocopherols, and in particular vitamin E, are employed as polymerization inhibitors, not only is it possible to obtain the reaction products in the purity sought, the physiological tolerability of the inhibitor component used here is a further advantage in the context of the procedure according to the invention.

The reaction temperature can be between 50° and 150° C., preferably between 70° and 120° C. Water formed during the condensation is distilled off in the course of the reaction. This can be effected either by carrying out the reaction under reduced pressure, for example between 1 and 600 mm Hg, or by carrying out the reaction in the presence of azeotropic entraining agents, such as, for example, cyclohexane, toluene or xylene. The reaction in general takes 10 minutes to 5 hours. It can be ended by removal of the ion exchanger by filtration. The resulting polymerizable unsaturated resins in general have a viscosity of between 20 and 4000 mPas (20° C.), depending on the starting substance chosen.

These reaction products can be used as binders or also as reactive diluents in curable coating compositions.

Low-viscosity resins of the type described above are already usable coating compositions in themselves. However, they are also suitable as reactive diluents for high-viscosity resins which can be cured by radiation. These binders or diluents can be used in amounts of 0 to 80, preferably 10 to 60% by weight, based on the coating composition. In addition, however, it is also possible for the customary reactive diluents, such as, for example, butanediol diacrylate, trimethylolpropane triacrylate, N-vinylpyrrolidone, divinylurea, hexanediol diacrylate or 2-ethylhexyl acrylate, additionally to be employed at the same time.

To achieve particular effects, it is possible to add to the coating compositions inorganic or organic pigments, such as, for example, titanium dioxide, or fillers, such as talc, in amounts of 0 to 80, preferably 3 to 60% by weight, based on the coating composition.

The organic additives customary in the coating industry, such as thixotropic agents, flow control agents, deaerating agents or lubricants, furthermore can be present in amounts of up to 10% by weight.

In addition to the unsaturated resins according to the invention which can be cured by polymerization, the coating compositions can also comprise 0 to 90% by weight of other polymerizable unsaturated binders, for example unsaturated polyesters or acrylate-modified epoxy resins, polyurethanes and saturated polyesters.

The binders according to the invention can be used for coating substrates, such as wood, glass, textiles, metal, paper or plastic, and furthermore as filler compositions or as printing inks.

Curing takes place by polymerization of the acrylic groups. It can be initiated either with the aid of electron beams having an energy of between 50 and 500 KeV or by UV light. In the latter case, photoinitiators such as are described, for example in UV&EB Curing Formulations for Printing Inks, Coatings & Paints, ISBN 0 947798 02 1 or in German Offenlegungsschrift 3,815,622 are added to the coating compositions, advantageously in amounts of 0.5 to 10% by weight.

The advantages of the binders according to the invention are that the products have a low viscosity and therefore are easy to handle. Furthermore, in the present case, the binders are prepared by a simplified process, in particular in a single reaction step. Etherification of the methylolated urethanes and ureas, such as is necessary according to the prior art, is dispensed with here. The products according to the invention moreover are distinguished by the fact that they comprise only a small portion of unreacted hydroxyalkyl acrylate, and that the proportion of copolymerized hydroxyalkyl acrylate is higher than in the prior art.

The parts mentioned in the following examples are parts by weight.

EXAMPLE 1

A mixture of 117 parts of butyl urethane, 82.5 parts of paraformaldehyde (about 91.2% strength), 209 parts of hydroxyethyl acrylate (HEA), 0.1 part of hydroquinone monomethyl ether and 1.8 parts of a strongly acid ion exchanger is heated to 90°-100° C. in the course of 30 minutes, while passing air through; after the mixture has been stirred at the same temperature for a further 60 minutes, the volatile constituents are distilled off under a pressure of 100-120 mbar in the course of 1.5 hours.

After cooling to 50° C., the catalyst is filtered off to give 340 parts of a colorless liquid having the following parameters:

Viscosity: 44 mPas
Content of double bonds: 11.5%
OH number: 22 mg of KOH/g
Content of free HEA: 4.5%
Mol of bonded HEA/mol of urethane: about 1.7

EXAMPLE 2

A mixture of 117 parts of butyl urethane, 82.5 parts of paraformaldehyde (about 91.2% strength), 209 parts of hydroxyethyl acrylate (HEA), 0.1 part of hydroquinone monomethyl ether and 3 parts of a strongly acid ion exchanger is heated to 90°-100° C. in the course of 30 minutes, while passing air through; after the mixture has been stirred at the same temperature for a further 60 minutes, the volatile constituents are distilled off under a pressure of 100-120 mbar in the course of 1.5 hours.

After cooling to 50° C., the catalyst is filtered off to give 339 parts of a colorless liquid having the following parameters:

Viscosity: 44 mPas
Content of double bonds: 11.5%
OH number: 13 mg of KOH/g
Content of free HEA: 2.7%
Mol of bonded HEA/mol of urethane: about 1.7

EXAMPLE 3

A mixture of 89 parts of ethyl urethane, 82.5 parts of paraformaldehyde (about 91.2% strength), 209 parts of hydroxyethyl acrylate (HEA), 0.1 part of hydroquinone monomethyl ether and 2.8 parts of a strongly acid ion exchanger is heated to 90°-100° C. in the course of 30 minutes, while passing air through; after the mixture has been stirred at the same temperature for a further 60 minutes, the volatile constituents are distilled off under a pressure of 100-120 mbar in the course of 1.5 hours.

After cooling to 50° C., the catalyst is filtered off to give 320 parts of a colorless liquid having the following parameters:

Viscosity: 44 mPas
Content of double bonds: 12.8 %
OH number: 33 mg of KOH/g
Content of free HEA: 6.8%
Mol of bonded HEA/mol of urethane: about 1.6

EXAMPLE 4

A mixture of 117 parts of butyl urethane, 82.5 parts of paraformaldehyde (about 91.2% strength), 174 parts of hydroxyethyl acrylate (HEA), 195 parts of a commercially available polytetrahydrofuran (manufacturer BASF, PTHF 650, OH number; 86 mg of KOH/g), 0.1 part of hydroquinone monomethyl ether and 3 parts of a strongly acid ion exchanger is heated to 90°-100° C. in the course of 30 minutes, while passing air through; after the mixture has been stirred at the same temperature for a further 60 minutes, the volatile constituents are distilled off under a pressure of 110-120 mbar in the course of 1.5 hours.

After cooling to 50° C., the catalyst is filtered off to give 339 parts of a colorless liquid having the following parameters:
Viscosity: 335 mPas
Content of double bonds: 6.3%
OH number: 31 mg of KOH/g

EXAMPLE 5

A mixture of 117 parts of butyl urethane, 82.5 parts of paraformaldehyde (about 91.2% strength), 174 parts of hydroxyethyl acrylate (HEA), 45 parts of polyethylene glycol 300, 0.1 part of hydroquinone monomethyl ether and 1.9 parts of a strongly acid ion exchanger is heated to 90°–100° C. in the course of 30 minutes, while passing air through; after the mixture has been stirred at the same temperature for a further 60 minutes, the volatile constituents are distilled off under a pressure of 100–120 mbar in the course of 1.5 hours.

After cooling to 50° C., the catalyst is filtered off to give 356 parts of a colorless liquid having the following parameters:
Viscosity: 86 mPas
Content of double bonds: 9.5%
OH number: 30 mg of KOH/g

EXAMPLE 6

A mixture of 117 parts of butyl urethane, 82.5 parts of paraformaldehyde (about 91.2% strength), 174 parts of hydroxyethyl acrylate (HEA), 54 parts of a polycaprolactone (Interox, CAPA 305, OH number 312 mg of KOH/g), 0.1 part of hydroquinone monomethyl ether and 1.9 parts of a strongly acid ion exchanger is heated to 90°–100° C. in the course of 30 minutes, while passing air through; after the mixture has been stirred at the same temperature for a further 60 minutes, the volatile constituents are distilled off under a pressure of 100–120 mbar in the course of 1.5 hours.

After cooling to 50° C., the catalyst is filtered off to give 360 parts of a colorless liquid having the following parameters:
Viscosity: 158 mPas
Content of double bonds: 9.4%
OH number: 32 mg of KOH/g

EXAMPLE 7

A mixture of 117 parts of butyl urethane, 82.5 parts of paraformaldehyde (about 91.2% strength), 174 parts of hydroxyethyl acrylate (HEA), 17.7 parts of hexane-1,6-diol, 0.1 part of hydroquinone monomethyl ether and 1.7 parts of a strongly acid ion exchanger is heated to 90°–100° C. in the course of 30 minutes, while passing air through; after the mixture has been stirred at the same temperature for a further 60 minutes, the volatile constituents are distilled off under a pressure of 100–120 mbar in the course of 1.5 hours.

After cooling to 50° C., the catalyst is filtered off to give 332 parts of a colorless liquid having the following parameters:
Viscosity: 71 mPas
Content of double bonds: 10.2%
OH number: 29 mg of KOH/g Amberlyst 15 was used as the ion exchanger in all the examples.

COMPARISON 1

Procedure Analogous to Example 4 from DOS 2,558,482)

117 parts of butylurethane and 205 parts of 37% strength formalin solution were brought to a pH of 8 with saturated sodium carbonate solution and the mixture was stirred at 80°–85° C. for 60 minutes. 110 parts of a mixture of water and formaldehyde were then distilled off under a water pump vacuum in the course of 1 hour.

0.1 part of hydroquinone monomethyl ether, 3.2 parts of concentrated hydrochloric acid and 209 parts of hydroxyethyl acrylate were added to the residue and the mixture was heated at 100° C. for 30 minutes. The volatile constituents were then distilled off at the same temperature under a pressure of 130 mbar in the course of 1.5 hours (weight loss: about 31 parts).

382 parts of a clear liquid having the following parameters remained as the residue:
Viscosity: 33 mPas
Content of double bonds: 11.9%
OH number: 104 mg of KOH/g
Content of free HEA: 21.5%
Mol of bonded HEA/mol of urethane: about 1.1

COMPARISON 2

Procedure Analogous to Examples 1–3 from DOS 2,558,482 or DE 1,745,540)

a) Preparation of the urethane resin etherified with butyl 117 parts of butylurethane, 370 parts of n-butanol and 82 parts of paraformaldehyde were heated at 100°–110° C. with 2.5 parts of acid ion exchanger for 1.5 hours. The volatile constituents were then distilled off under a pressure of 100 mbar at the same temperature in the course of 1.5 hours. Filtration gave 303 parts of a clear colorless liquid having the following parameters:
Solids content (1 hour at 125° C.): 94.5%
OH number: 11 (corresponds to a butanol content of 1.6%)

b) Transetherification with hydroxyethyl acrylate in the presence of an acid ion exchanger 210 parts of hydroxyethyl acrylate, 0.1 part of hydroquinone monomethyl ether and 2.1 parts of an acid ion exchanger were added to the above residue, and the mixture was stirred at 100° C. for 30 minutes; the volatile constituents were then distilled off at the same temperature under a pressure of 100 mbar in the course of 3 hours (about 144 parts).

The residue was filtered to give 326 parts of a colorless clear liquid having the parameters:
Viscosity: 28 mPas
Content of double bonds: 8.9%
OH number: 102 mg of KOH/g
Content of free HEA: 21.1%
Mol of bonded HEA/mol of urethane: about 1.2

COMPARISON 3

(Procedure Analogous to Examples 1–3 from DOS 2,558,482 or DE 1,745,540)

a) Preparation of the starting material as described under 2e)

b) Transetherification with hydroxyethyl acrylate in the presence of hydrochloric acid 210 parts of hydroxyethyl acrylate, 0.1 part of hydroquinone monomethyl ether and 2 parts of concentrated hydrochloric acid were added to the residue from Comparison Example 2a), and the mixture was stirred at 100° C. for 30 minutes; the volatile constituents were then distilled off at the same temperature under a pressure of 100 mbar in the course of 3 hours (about 188 parts). The residue was filtered to give 384 parts of a colorless clear liquid having the parameters:

Viscosity: 14 mPas
Content of double bonds: 10.1%
OH number: 152 mg of KOH/g
Content of free HEA: 31.4%
Mol of bonded HEA/mol of urethane: about 0.8

We claim:

1. A binder obtained by simultaneous reaction of
   A) a urethane or urea,
   B) an acrylic or methacrylic compound containing hydroxyl groups,
   C) paraformaldehyde and
   D) optionally, a polyol,
   wherein, in the case where no polyol D) is also reacted, the reaction is carried out in the presence of an acid ion exchanger, and in the case where a polyol D) is also reacted, the reaction is carried out in the presence of an acid ion exchanger or a strong acid.

2. A binder as claimed in claim 1, which is prepared in the presence of a polymerization inhibitor.

3. A binder as claimed in claim 1, which is derived from a urethane or urea of the formula

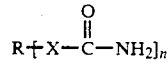

in which

X is an oxygen atom or a group of the formula —NH— and n is a number from 1 to 5, and, in the case where n is 1, R is $C_1$-$C_{10}$-alkyl, benzyl, phenyl or a group of the formula $R^1$—OCH$_2$CH$_2$— or $R^1$—O—CH(CH)$_3$—CH$_2$— and in the case where n is a number from 2 to 5, R is $C_4$-$C_{15}$-alkylene, phenylene or a group of the formula —(OCH$_2$CH$_2$)$_x$O— or —(OCH(CH$_3$)CH$_2$)$_x$O—, in which the value for the index x is chosen such that the polyoxyalkylene groups have molecular weights of 100 to 1500, and $R^1$ is hydrogen, $C_1$-$C_4$-alkyl or phenyl.

4. A binder as claimed in claim 1, which is prepared from ethyl- or butylurethane as component A).

5. A binder as claimed in claim 1, which is prepared from a (meth)acrylic acid $C_2$-$C_4$-alkyl ester as component B).

6. A binder as claimed in claim 1, which is prepared from a $C_2$-$C_{15}$-di-, tri- or -tetraol; polyesterpolyol; polyether-polyol; polycarbonate-diol or polycarbonate-triol as component D).

7. A process for the preparation of a binder as claimed in claim 1, which comprises reacting
   A) a urethane or urea,
   B) an acrylic or methacrylic compound containing hydroxyl groups,
   C) paraformaldehyde and
   D) optionally, a polyol,
   wherein, in the case where no polyol D) is also reacted, the reaction is carried out in the presence of an acid ion exchanger, and in the case where a polyol D) is also reacted, the reaction is carried out in the presence of an acid ion exchanger or a strong acid.

8. The binder as claimed in claim 1 for coating substrates, as a filler composition or as a printing ink.

* * * * *